(12) United States Patent
Gurijala et al.

(10) Patent No.: US 11,820,880 B2
(45) Date of Patent: Nov. 21, 2023

(54) COMPOSITIONS AND METHODS FOR CARBON FIBER-METAL AND OTHER COMPOSITES

(71) Applicant: Boston Materials, Inc., Billerica, MA (US)

(72) Inventors: Anvesh Gurijala, Lancaster, MA (US); Randall Morgan Erb, Newton, MA (US); Rasam Soheilian, Brookline, MA (US)

(73) Assignee: Boston Materials, Inc., Billerica, MA (US)

( * ) Notice: Subject to any disclaimer, the term of this patent is extended or adjusted under 35 U.S.C. 154(b) by 0 days.

(21) Appl. No.: 16/924,381

(22) Filed: Jul. 9, 2020

(65) Prior Publication Data

US 2021/0008840 A1 Jan. 14, 2021

Related U.S. Application Data

(60) Provisional application No. 62/938,265, filed on Nov. 20, 2019, provisional application No. 62/872,686, filed on Jul. 10, 2019.

(51) Int. Cl.
*C08K 9/10* (2006.01)
*B32B 5/26* (2006.01)
(Continued)

(52) U.S. Cl.
CPC .............. *C08K 9/10* (2013.01); *B29C 70/025* (2013.01); *B32B 5/12* (2013.01); *B32B 5/26* (2013.01);
(Continued)

(58) Field of Classification Search
CPC ........... C08K 3/00; C08K 3/01; C08K 3/013; C08K 3/02; C08K 3/04; C08K 3/041;
(Continued)

(56) References Cited

U.S. PATENT DOCUMENTS 4,025,911 A 5/1977 Bobeck et al.
4,481,249 A 11/1984 Ebneth et al.
(Continued)

FOREIGN PATENT DOCUMENTS

CN 1784516 A 6/2006
CN 1906234 A 1/2007
(Continued)

OTHER PUBLICATIONS

International Search Report and Written Opinion for Application No. PCT/US2018/021975 dated May 24, 2018.
(Continued)

*Primary Examiner* — Maria V Ewald
*Assistant Examiner* — Ethan A. Utt
(74) *Attorney, Agent, or Firm* — Wolf, Greenfield & Sacks, P.C.

(57) ABSTRACT

The present disclosure generally relates to systems and methods for composites, including carbon fiber-metal composites. In some cases, the composites may be formed from one, two, or more layers of metals or other substrates, sandwiching a plurality of aligned fibers. The fibers may be substantially aligned, and may be present at relatively high densities within the composite. The composites may be prepared, in some aspects, by dispersing fibers by neutralizing the electrostatic interactions between the fibers, for example using aqueous liquids containing the fibers that are able to neutralize the electrostatic interactions that typically occur between the fibers. In some cases, the fibers may be aligned using techniques such as shear flow and/or magnetism. Other aspects are generally directed to methods of using such composites, kits including such composites, or the like.

35 Claims, 1 Drawing Sheet

(51) Int. Cl.
*C08K 7/06* (2006.01)
*B32B 5/12* (2006.01)
*B32B 7/12* (2006.01)
*B32B 15/04* (2006.01)
*B32B 15/14* (2006.01)
*B32B 15/18* (2006.01)
*C22C 38/00* (2006.01)
*B29C 70/02* (2006.01)
*B29C 70/42* (2006.01)
*B29C 70/44* (2006.01)

(52) U.S. Cl.
CPC .............. *B32B 7/12* (2013.01); *B32B 15/04* (2013.01); *B32B 15/14* (2013.01); *B32B 15/18* (2013.01); *C08K 7/06* (2013.01); *C22C 38/00* (2013.01); *B29C 70/42* (2013.01); *B29C 70/443* (2013.01); *B32B 2250/03* (2013.01); *B32B 2250/04* (2013.01); *B32B 2250/20* (2013.01); *B32B 2250/40* (2013.01); *B32B 2260/021* (2013.01); *B32B 2260/046* (2013.01); *B32B 2262/106* (2013.01); *B32B 2311/24* (2013.01); *B32B 2311/30* (2013.01)

(58) Field of Classification Search
CPC . C08K 3/046; C08K 3/08; C08K 3/10; C08K 3/105; C08K 3/11; C08K 3/20; C08K 3/22; C08K 2003/0812; C08K 2003/0843; C08K 2003/0856; C08K 2003/0862; C08K 2003/221; C08K 2003/2213; C08K 2003/2265; C08K 2003/2289; C08K 2003/2293; C08K 7/00; C08K 7/02; C08K 7/04; C08K 7/06; C08K 9/00; C08K 9/02; C08K 9/04; C08K 9/10; C08K 2201/00; C08K 2201/002; C08K 2201/003; C08K 2201/004; C08K 2201/005; C08K 2201/01; Y10T 428/12; Y10T 428/12014; Y10T 428/12028; Y10T 428/12035; Y10T 428/12049; Y10T 428/12181; Y10T 428/12444; Y10T 428/12465; Y10T 428/12493; Y10T 428/12535; Y10T 428/12542; Y10T 428/12549; Y10T 428/12556; Y10T 428/12562; Y10T 428/12569; Y10T 428/12583; Y10T 428/1259; Y10T 428/12611; Y10T 428/12618; Y10T 428/12771; Y10T 428/12861; Y10T 428/12951; Y10T 428/12958; Y10T 428/12965; Y10T 428/12972; Y10T 428/1979; Y10T 428/12986; Y10T 428/25; Y10T 428/256; Y10T 428/257; Y10T 428/29; Y10T 428/2913; Y10T 428/2918; Y10T 428/2927; Y10T 428/2933; Y10T 428/2938; Y10T 428/294; Y10T 428/2958; Y10T 428/2964; Y10T 428/298; Y10T 428/2982; Y10T 428/31678; Y10T 428/28; Y10T 428/2804; Y10T 428/2848; Y10S 428/90; Y10S 428/903; B32B 5/00; B32B 5/02; B32B 7/00; B32B 7/02; B32B 7/025; B32B 7/03; B32B 7/04; B32B 7/12; B32B 15/00; B32B 15/01; B32B 15/011; B32B 15/04; B32B 15/043; B32B 15/08; B32B 15/082; B32B 15/085; B32B 15/088; B32B 15/09; B32B 15/092; B32B 15/095; B32B 15/14; B32B 15/16; B32B 15/18; B32B 2260/00; B32B 2260/02; B32B 2260/021; B32B 2260/025; B32B 2260/04; B32B 2260/046; B32B 2262/10; B32B 2262/106; B32B 2262/16; B32B 2264/10; B32B 2264/102; B32B 2264/105; B32B 2264/1052; B32B 2264/1056; B32B 2264/12; B32B 2264/20; B32B 2264/204; B32B 2264/304; B32B 2264/40; B32B 2264/401; B32B 2264/402; B32B 2264/50; B32B 2264/503; B32B 2305/22; B32B 2305/24; B32B 2305/30; B32B 2307/20; B32B 2307/208
USPC .............. 523/400, 440, 468, 500, 512, 513; 524/495, 496, 847; 428/544, 546, 548, 428/549, 551, 570, 608, 611, 615, 428/621–626, 628, 629, 632–635, 655, 428/668, 681–686, 323, 328, 329, 357, 428/364, 367, 372, 375, 378, 379, 389, 428/392, 401, 402, 457, 900, 903, 343, 428/344, 354
See application file for complete search history.

(56) References Cited

U.S. PATENT DOCUMENTS

| | | |
|---|---|---|
| 4,523,628 A | 6/1985 | Vives |
| 5,432,000 A | 7/1995 | Young et al. |
| 5,876,540 A | 3/1999 | Pannell |
| 5,968,639 A | 10/1999 | Childress |
| 7,073,538 B2 | 7/2006 | Bhatnagar et al. |
| 7,409,757 B2 | 8/2008 | Hall et al. |
| 7,439,475 B2 | 10/2008 | Ohta |
| 7,537,825 B1 | 5/2009 | Wardle et al. |
| 7,655,581 B2 | 2/2010 | Goering |
| 7,803,262 B2 | 9/2010 | Haik et al. |
| 7,832,983 B2 | 11/2010 | Kruckenberg et al. |
| 7,951,464 B2 | 5/2011 | Roberts |
| 8,173,857 B1 | 5/2012 | Yananton |
| 8,197,888 B2 | 6/2012 | Sue et al. |
| 8,575,045 B1 | 11/2013 | McKnight et al. |
| 8,790,565 B2 | 7/2014 | Miller |
| 8,889,761 B2 | 11/2014 | Studart et al. |
| 9,312,046 B2 | 4/2016 | Hong et al. |
| 9,388,577 B2 | 7/2016 | Kromer et al. |
| 9,394,196 B2 | 7/2016 | Peters et al. |
| 9,732,463 B2 | 8/2017 | Carter et al. |
| 9,892,835 B2 | 2/2018 | Hong et al. |
| 9,896,783 B2 | 2/2018 | Kia |
| 11,479,656 B2 | 10/2022 | Soheilian et al. |
| 2005/0058805 A1 | 3/2005 | Kimura et al. |
| 2005/0175813 A1 | 8/2005 | Wingert et al. |
| 2005/0239948 A1 | 10/2005 | Haik et al. |
| 2006/0286361 A1* | 12/2006 | Yonetake ............... B82Y 30/00 428/293.1 |
| 2008/0145647 A1 | 6/2008 | Ganguli et al. |
| 2008/0274326 A1* | 11/2008 | Kim ....................... B32B 27/36 427/463 |
| 2009/0117269 A1 | 5/2009 | Hansen et al. |
| 2009/0227162 A1 | 9/2009 | Kruckenberg et al. |
| 2010/0040902 A1* | 2/2010 | Mizrahi ................. B32B 27/40 428/600 |
| 2010/0196688 A1 | 8/2010 | Kritzer et al. |
| 2010/0320320 A1 | 12/2010 | Kismar et al. |
| 2011/0186775 A1 | 8/2011 | Shah et al. |
| 2012/0107599 A1 | 5/2012 | Yonetake et al. |
| 2012/0289107 A1 | 11/2012 | Beissinger et al. |
| 2013/0053471 A1* | 2/2013 | Studart .................... C08J 5/24 523/115 |
| 2013/0252497 A1 | 9/2013 | Schiebel et al. |
| 2013/0316148 A1* | 11/2013 | Gunnink ................ B32B 15/14 428/433 |
| 2014/0250665 A1 | 9/2014 | Choi et al. |
| 2014/0342630 A1 | 11/2014 | Amtmann et al. |

(56) References Cited

U.S. PATENT DOCUMENTS

| | | | |
|---|---|---|---|
| 2015/0228388 | A1 | 8/2015 | Hong et al. |
| 2016/0055930 | A1 | 2/2016 | Humfeld |
| 2016/0083535 | A1 | 3/2016 | Wilenski et al. |
| 2016/0169009 | A1 | 6/2016 | Okamoto et al. |
| 2016/0340482 | A1* | 11/2016 | Williams .............. B29C 70/081 |
| 2017/0067186 | A1 | 3/2017 | Kia |
| 2017/0101730 | A1 | 4/2017 | Gilbertson |
| 2017/0173895 | A1 | 6/2017 | Williams |
| 2017/0182700 | A1 | 6/2017 | Brady |
| 2017/0240715 | A1* | 8/2017 | Hsiao ....................... C08K 7/06 |
| 2017/0338497 | A1 | 11/2017 | Tatsuno et al. |
| 2018/0016420 | A1* | 1/2018 | Fujimaki .............. C08K 5/1515 |
| 2018/0016740 | A1 | 1/2018 | Kia et al. |
| 2019/0048500 | A1 | 2/2019 | Tierney et al. |
| 2020/0024795 | A1 | 1/2020 | Gurijala et al. |
| 2021/0009789 | A1 | 1/2021 | Soheilian et al. |
| 2022/0001631 | A1 | 1/2022 | Mone et al. |
| 2023/0002591 | A1 | 1/2023 | Soheilian et al. |

FOREIGN PATENT DOCUMENTS

| | | |
|---|---|---|
| CN | 101224601 A | 7/2008 |
| CN | 105073848 A | 11/2015 |
| CN | 105390210 A | 3/2016 |
| CN | 105690802 A | 6/2016 |
| CN | 105734535 A | 7/2016 |
| EP | 2013408 B1 | 1/2009 |
| EP | 2085215 A1 | 8/2009 |
| EP | 3184288 A1 | 6/2017 |
| JP | 07-197311 A | 8/1995 |
| JP | 07-331358 A | 12/1995 |
| JP | 2015-063664 A | 4/2015 |
| JP | 2016-044302 A | 4/2016 |
| JP | 2016-064648 A | 4/2016 |
| WF | WO 2011/100734 A1 | 8/2011 |
| WO | WO 2001/025514 A1 | 4/2001 |
| WO | WO 2005/085334 A2 | 9/2005 |
| WO | WO 2007/130979 A2 | 11/2007 |
| WO | WO 2009/009207 A2 | 1/2009 |
| WO | WO 2018/175134 A1 | 9/2018 |
| WO | WO 2020/123334 A1 | 9/2018 |
| WO | WO 2021/007389 A1 | 1/2021 |
| WO | WO 2021/0073381 A1 | 1/2021 |

OTHER PUBLICATIONS

International Preliminary Report on Patentability for Application No. PCT/US2018/021975 dated Oct. 3, 2019.
[No Author Listed], Permanent Magnets vs Electromagnets. Adams Magnetic Products. Accessed Sep. 20, 2017. 5 pages.
Boden et al., Nanoplatelet size to control the alignment and thermal conductivity in copper-graphite composites. Nano Lett. Jun. 11, 2014;14(6):3640-4. doi: 10.1021/nl501411g. Epub May 22, 2014.
Erb et al., Composites reinforced in three dimensions by using low magnetic fields. Science. Jan. 13, 2012;335(6065):199-204. doi: 10.1126/science.1210822.
Erb et al., Concentration gradients in mixed magnetic and nonmagnetic colloidal suspensions. J Appl Phys. Mar. 7, 2008;103(07A312):1-3.
Erb et al., Magnetic assembly of colloidal superstructures with multipole symmetry. Nature. Feb. 19, 2009;457(7232):999-1002. doi: 10.1038/nature07766.
Erb et al., Non-linear alignment dynamics in suspensions of platelets under rotating magnetic fields. Soft Matter. 2012;8:7604-9.
Jackson et al., Out-of-plane properties. NASA, Langley Research Center Mechanics of Textile Composites Conference. Oct. 1, 1995:315-348.
Le Ferrand et al., Magnetically assisted slip casting of bioinspired heterogeneous composites. Nat Mater. Nov. 2015; 14(11):1172-9. doi: 10.1038/nmat4419. Epub Sep. 21, 2015.
Libanori et al., Mechanics of platelet-reinforced composites assembled using mechanical and magnetic stimuli. ACS Appl Mater Interfaces. Nov. 13, 2013;5(21):10794-805. doi: 10.1021/am402975a. Epub Oct. 25, 2013.
Libanori et al., Ultrahigh magnetically responsive microplatelets with tunable fluorescence emission. Langmuir. Nov. 26, 2013;29(47):14674-80. doi: 10.1021/la4027305. Epub Nov. 15, 2013.
Martin et al., Designing bioinspired composite reinforcement architectures via 3D magnetic printing. Nat Commun. Oct. 23, 2015;6:8641. doi: 10.1038/ncomms9641.
Martin et al., Understanding and overcoming shear alignment of fibers during extrusion. Soft Matter. Jan. 14, 2015;11(2):400-5. doi: 10.1039/c4sm02108h.
Matthews et al., Magnetic alignment of mesophase pitch-based carbon fibers. Appl Phys Lett. Jul. 15, 1996;69(3):430-2.
Ooi et al., On the controllability of nanorod alignment in magnetic fluids. Journal of Applied Physics. Feb. 7, 2008;103(07E910):1-3.
Sander et al., High-performance battery electrodes via magnetic templating. Nature Energy. Aug. 2016;1:1-7.
Sommer et al., Injectable materials with magnetically controlled anisotropic porosity. ACS Appl Mater Interfaces. Oct. 24, 2012;4(10):5086-91. doi: 10.1021/am301500z. Epub Oct. 9, 2012.
International Search Report and Written Opinion for Application No. PCT/US2020/041322 dated Oct. 9, 2020.
U.S. Appl. No. 16/495,890, filed Sep. 20, 2019, Gurijala et al.
U.S. Appl. No. 16/924,349, filed Jul. 9, 2020, Gurijala et al.
PCT/US2018/021975, May 24, 2018, International Search Report and Written Opinion.
PCT/US2018/021975, Oct. 3, 2019, International Preliminary Report on Patentability.
Extended European Search Report for Application No. 18770244.4 dated Dec. 3, 2020.
International Search Report and Written Opinion for Application No. PCT/US2019/065142 dated Mar. 10, 2020.
International Preliminary Report on Patentability for Application No. PCT/US2019/065142 dated Jun. 24, 2021.
Invitation to Pay Additional Fees for Application No. PCT/US2020/041306 dated Oct. 29, 2020.
International Search Report and Written Opinion for Application No. PCT/US2020/041306 dated Dec. 21, 2020.
[No Author Listed], HexTow® IM7 Carbon Fiber. HEXCEL® Product Data Sheet. Jan. 1, 2020. Retrieved from the Internet. 2 pages.
Huang, Fabrication and properties of carbon fibers. Materials. Dec. 16, 2009; 2: 2369-403. doi:10.3390/ma2042369.
Kimura et al., Uniaxial alignment of the smallest diamagnetic susceptibility axis using time-dependent magnetic fields. Langmuir. Jul. 6, 2004;20(14):5669-72. doi: 10.1021/la049347w.
Matsuo, Electric, Dielectric and Magnetic Properties of Polymer and Carbon Fillers. International Workshop on Advanced Polymer Science and Turbulent Drag Reduction. Mar. 10-20, 2008. 57 pages.
Sherman et al., Fiber sizings: coupling agent companions. Composites World. Aug. 1, 2013. Retrieved from the Internet at URL:https://www.compositesworld.com/articles/fiber-sizings-coupling-agent-companions. Last Accessed Oct. 2, 2020, 1 page.
Chinese Office Action for Application No. 20188003308.2 dated Jun. 29, 2021.
Chinese Office Action for Application No. 20188003308.2 dated Jan. 24, 2022.
Chinese Office Action for Application No. 201880033308.2 dated Jul. 29, 2022.
Japanese Office Action for Application No. 2020-500780 dated Feb. 15, 2022.
Japanese Office Action for Application No. 2020-500780 dated Jun. 28, 2022.
Chinese Office Action for Application No. 2019800800347 dated Feb. 16, 2022.
Chinese Office Action for Application No. 2019800800347 dated Jun. 28, 2022.
Extended European Search Report for Application No. 19896171.6 dated Aug. 16, 2022.
International Preliminary Report on Patentability for Application No. PCT/US2020/041306 dated Jan. 20, 2022.

(56) References Cited

OTHER PUBLICATIONS

International Preliminary Report on Patentability for Application No. PCT/US2020/041322 dated Jan. 20, 2022.
Walsh et al., Carbon fibers. Composites. ASM International. 2001; 35-40.
European Office Action dated Nov. 21, 2022, for Application No. 18770244.4.
Chinese Office Action dated Jan. 10, 2023, for Application No. CN201980080034.7.
[No Author Listed], New Practical Handbook of Hardware. Ed. Zhenwu, Z. Liaoning Science and Tech Publishing House, Jan. 2015: 1486-7.
Barrett et al., The mechanics of z-fiber reinforcement. Composite Structures. Sep. 1996; 36(1-2): 23-32.
Gardiner, Z-direction composite properties on an affordable, industrial scale. Composite World. Apr. 20, 2021. <https://www.compositesworld.com/articles/z-direction-composite-properties-on-an-affordable-industrial-scale>. 9 pages.
Hashin, Analysis of the effects of fiber anisotropy on the properties of carbon and graphite fiber composites. J Appl Mech. 1979; 46: 543-50.

* cited by examiner

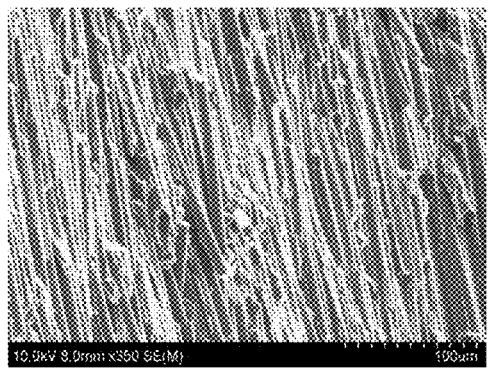
FIG. 1
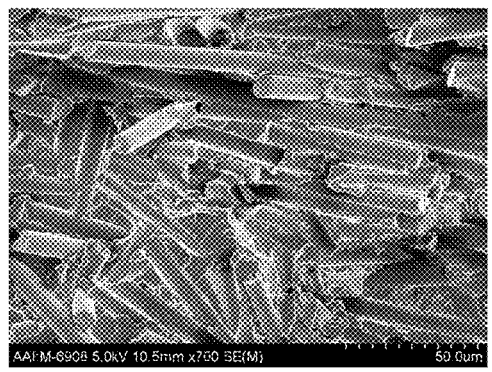
FIG. 2
|  | 0.9 Steel | 0.3 Steel / 0.3 CFRP / 0.3 Steel | 0.3 Steel / 0.3 Epoxy / 0.3 Steel |
|---|---|---|---|
| Total deformation under 10 MPa | 0.0053559 mm | 0.0081374 mm | 0.011334 mm |
| Bending Stiffness | 1867 N/mm | 1229 N/mm | 882 N/mm |
| Calculated Modulus | 1204 GPa | 792.7 GPa | 569.1 GPa |
| Relative weight | 8.0 | 5.9 | 5.8 |
FIG. 3
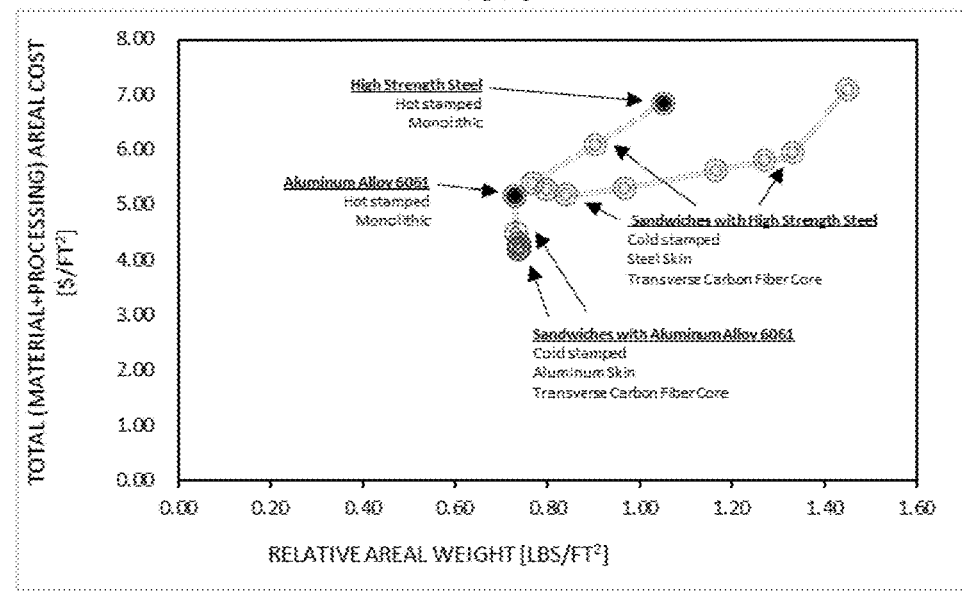
FIG. 4

COMPOSITIONS AND METHODS FOR CARBON FIBER-METAL AND OTHER COMPOSITES

RELATED APPLICATIONS

This application claims the benefit of U.S. Provisional Patent Application Ser. No. 62/872,686, filed Jul. 10, 2019, entitled "Systems and Methods for Short-Fiber Films and Other Composites," and of U.S. Provisional Patent Application Ser. No. 62/938,265, filed Nov. 20, 2019, entitled "Methods and Systems for Forming Composites Comprising Thermosets." Each of these is incorporated herein by reference in its entirety.

FIELD

The present disclosure generally relates to systems and methods for composites, including carbon fiber-metal composites.

BACKGROUND

Cold stamping is a process that is used to conform flat sheet metal into three-dimensional brackets, panels, and components between a female and male die set. The closing of the die set forces the sheet metal to bend and stretch in order to conform to the features of the die. The sheet metal can even be cut using this process. Cold stamping is heavily utilized in the high-rate production of frame and closure components for mass-market vehicles. Cold stamping is effective for high-rate production because it requires relatively low energy consumption, compared to heated stamping, machining, or casting.

As the automotive industry seeks to deliver more fuel-efficient vehicles to satisfy government legislation and customer demand, conventional mild and high-strength low-alloy (HSLA) steels are being replaced with high strength steel (HSS) and aluminum alloys. Both HSS and aluminum alloys allow lighter structures through a combination of thinner parts and reduced density. There is an emphasis on utilizing more aluminum alloys over steels because of their nearly three-fold lower density.

5000-series aluminum alloys are compatible with most cold stamping methods. This has allowed the adoption of these lower-strength aluminum alloy grades in automotive closure applications. There is a demand for stronger 6000-series and 7000-series aluminum alloys to further reduce the weight of the frame and closure components. The stronger 6000-series and 7000-series aluminum alloys have limited formability, and cold stamping these aluminum alloys leads to parts fracturing and cracking during the cold stamping process. The ability to effectively cold stamp 6000-series and 7000-series aluminum alloy sheets is missing.

It is understood that the formability of sheet metal is higher as thickness increases only if the dominant type of deformation is stretching. Stretching is observed as the dominant type of deformation in HSLA and mild steels and lower-strength aluminum alloys that are commonly used in cold stamping processes. When the dominant type of deformation is mostly bending, formability of the sheet decreases as thickness increases. Bending is observed as the dominant type of deformation in 6000-series and 7000-series aluminum during cold stamping.

While thinner 6000-series and 7000-series sheets have a better ability to be cold stamped than thicker sheets, they also have lower mechanical properties (such as bending stiffness and puncture energy) than thicker sheets of the same material. The ability to retain the mechanical properties of thicker sheet metal but leverage the higher formability of thinner sheet metal is missing in materials that are commercially available.

SUMMARY

The present disclosure generally relates to systems and methods for composites, including carbon fiber-metal composites. The subject matter of the present disclosure involves, in some cases, interrelated products, alternative solutions to a particular problem, and/or a plurality of different uses of one or more systems and/or articles.

One aspect as discussed herein is generally drawn to a composite comprising a first substantially metallic layer and a second substantially metallic layer, and a core layer positioned between the first and second layers. In some cases, the core layer comprises a plurality of discontinuous fibers substantially transversely aligned at a fiber volume fraction of between, for example, 5 vol % and 91 vol % within the composite, or other percentages such as those described herein.

Another aspect is generally drawn to a composite comprising a first layer and a second layer, and a core layer positioned between the first and second layers. In certain embodiments, the core layer comprises a plurality of discontinuous fibers substantially transversely aligned at a fiber volume fraction of between, for example, 5 vol % and 91 vol % within the composite, or other percentages such as those described herein.

Still another aspect is generally drawn to a composite comprising a layer and a plurality of discontinuous fibers substantially transversely aligned to the layer. In certain instances, the plurality of discontinuous fibers are present at a fiber volume fraction of between, for example, 5 vol % and 91 vol % within the composite, or other percentages such as those described herein.

Yet another aspect is generally drawn to a method comprising applying a liquid to a first layer, wherein the liquid comprises a plurality of discontinuous fibers, to cause alignment, via shear flow, of at least some of the plurality of discontinuous fibers; applying a magnetic field to the liquid to cause alignment of at least some of the plurality of discontinuous fibers; applying a second layer to the plurality of discontinuous fibers; and applying heat and/or pressure to the first and second layers to form a composite.

Another aspect is generally drawn to a method comprising applying a liquid to a layer, wherein the liquid comprises a plurality of discontinuous fibers, to cause alignment, via shear flow, of at least some of the plurality of discontinuous fibers; applying a magnetic field to the liquid to cause alignment of at least some of the plurality of discontinuous fibers; and applying heat and/or pressure to the layer and the discontinuous fibers to form a composite.

In another aspect, the present disclosure encompasses methods of making one or more of the embodiments described herein. In still another aspect, the present disclosure encompasses methods of using one or more of the embodiments described herein.

Other advantages and novel features of the present disclosure will become apparent from the following detailed description of various non-limiting embodiments of the disclosure when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIG. 1 illustrates a substrate with substantially transversely aligned carbon fibers, in one embodiment;

FIG. 2 illustrates a substrate with partially aligned carbon fibers, in another embodiment;

FIG. 3 illustrates a comparison of materials prepared in accordance with one embodiment of the invention, and control materials; and FIG. 4 illustrates the weight and cost of various materials, including those in accordance with certain embodiments of the invention.

DETAILED DESCRIPTION

The present disclosure generally relates to systems and methods for composites, including carbon fiber-metal composites. In some cases, the composites may be formed from one, two, or more layers of metals or other substrates, sandwiching a plurality of aligned fibers. The fibers may be substantially aligned, and may be present at relatively high densities within the composite. The composites may be prepared, in some aspects, by dispersing fibers by neutralizing the electrostatic interactions between the fibers, for example using aqueous liquids containing the fibers that are able to neutralize the electrostatic interactions that typically occur between the fibers. In some cases, the fibers may be aligned using techniques such as shear flow and/or magnetism. Other aspects are generally directed to methods of using such composites, kits including such composites, or the like.

Certain aspects are generally directed to composites for use in various applications, for example, requiring relatively high mechanical properties. In some cases, the composite may include one, two, three, or more layers, e.g., comprising metals, wood, ceramics, polymers, etc., containing or sandwiching other layers, e.g., core layers. In some cases, the core layers may comprise short fibers (e.g., less than 5 mm in length), which may comprise carbon or other types of fibers. In some cases, the fibers may be oriented or aligned within the composite. For example, in some cases, the fibers may be oriented or aligned substantially orthogonally to the layer, and in certain embodiments, such fibers may be used to enhance the Z-axis mechanical properties of the composites.

In some embodiments, the composite may comprise two layers surrounding an core layer or material, e.g., to form a "sandwich" structure. The sandwich composite may thus comprise a core material that is contained between two skin materials. Examples include metallic, wood, composite, ceramic, natural, or composite skin material. The core material may be a lower stiffness material, but it can provide thickness to the overall composite. The increased gap between the two skin layers may, in some embodiments, increase the moment of inertia, which may increases the stiffness of the composite. A core material with a lower density compared to the skin may also reduce the overall weight of the structure in certain embodiments. The inclusion of a different material as the core can also be used in some embodiments, for example, to suppress puncture, vibration, heat, electrical discharge, etc. Other properties include those discussed in more detail herein.

In certain embodiments, a composite material may comprise a "core" or intermediate layer that includes transversely oriented carbon fiber embedded in a polymer matrix. The overall thickness of this composite may be less than one millimeter, or have other dimensions such as those described herein. In some cases, for example, multiples layers can be consolidated together to achieve a higher thickness. The core layer may, in certain embodiments, provide a high stiffness of carbon fibers in the transverse direction, e.g., as described herein. This material also may prevent the displacement of the matrix polymer in certain cases, e.g., if the matrix polymer is in a liquid or gelled state.

The core layer can be bonded between two layers, e.g., comprising sheet metal or other materials described herein, to create a sandwich composite structure (e.g., an A/B/A structure). However, the layers may have different compositions, sizes, etc., in some cases (e.g., forming an A/B/C structure). In addition, in some embodiments, it is possible to incorporate the transverse carbon fiber composite in a single-sided structure (e.g., an A/B structure), or multiple layers (e.g., A/B/A/B/A, A/B/A/B, etc.). Yet other embodiments include any of those described herein.

In certain embodiments, the transverse carbon fiber core may be used to provide high transverse stiffness, which results in better relative bending stiffness, and can allow the cold forming of various metals, for example, such as HSS and advanced HSS and ultra HSS and 6000-series and 7000-series aluminum alloy. Such materials may allow for the weight reduction of automobiles, or other applications including any of those discussed herein.

In some cases, a core layer may comprise carbon or other types of fibers that are oriented or aligned within the composite. A variety of methods may be used to produce such layers, and in some cases, such that the layer has a high fiber volume content, e.g., while maintaining dispersion or alignment of the fibers. In some embodiments, the fibers may be relatively short, and may comprise carbon or other materials. In some cases, the fibers may be homogeneously dispersed in a polymer resin or other slurry. Short fibers may have high electrostatic interactions that promotes agglomeration, and the high viscosity of polymer resins can prevent consistent dispersion at higher fiber volumes. These processing defects thus can cause inconsistent fiber reinforcement and gradients in resin content in the composite, which can drastically reduce the performance of the composite. Accordingly, certain embodiments as discussed herein can overcome these limitations. In addition, some embodiments are generally directed to aligned fibers that maintain high fiber volume content. Apart from issues with dispersing the short fibers, prior art methods struggle with issues such as low fiber volume fractions, insufficient alignment, or long overall fiber lengths that risk issues with fiber breaking.

As an example, in some cases, a composite may be prepared by neutralizing the electrostatic interactions between fibers, for example using aqueous slurries. In some cases, the slurries containing well-dispersed fibers can be metered onto substrates such as thermoplastic films. During metering, the alignment of the fibers can be controlled, for example, by using shear flow and/or magnetic alignment. This may be implemented, for example, in a roll-to-roll manufacturing process.

For instance, in one set of embodiments, an aqueous liquid comprising suitable fibers may be applied to a substrate, e.g., as a coating. The liquid may be selected to neutralize electrostatic interactions that typically occur between the fibers, as noted above. The substrate can be, for example, a thermoplastic film, or other materials such as discussed herein. The fibers may include carbon fibers and/or other fibers. The fibers are then aligned, for example, by applying a magnetic field and/or a shear force, e.g., by applying a suitable fluid to the liquid applied to the substrate. After alignment, the final composite may be formed, for example, by applying heat (e.g., to remove the liquid, for example, via evaporation), and/or pressure (e.g., to embed the fibers into the substrate), and/or introducing a thermoset layer that can optionally be cured.

The above discussion is a non-limiting example of one embodiment that can be used to produce certain types of composites. However, other embodiments are also possible. Accordingly, more generally, various aspects are directed to various systems and methods for producing various composites and materials, including but not limited to sandwich or other layered composites.

For example, certain aspects are generally directed to short-fiber films and other composites. In some cases, such composites may comprise a substrate and a plurality of discontinuous or short fibers contained or embedded within the composite, or at least a portion thereof. In some cases, the plurality of fibers are substantially aligned or oriented within the composite.

For example, in some embodiments, a composite may comprise one or more substrates or layers, such as is disclosed herein, and one or more layers of discontinuous fibers, e.g., aligned as discussed herein. For instance, in some cases, a composite may comprise a substrate or layer, for example, comprising a metal, wood, a ceramic, a polymer, etc., including any of those described herein, and a plurality of discontinuous fibers (which may be substantially transversely aligned in some embodiments). More than one such layer may be present in the composite. For example, in one embodiment, a composite may comprise two layers with a core layer of discontinuous fibers "sandwiched" between the two layers, e.g., forming an A/B/A structure. The discontinuous fibers may be substantially transversely aligned, e.g., as discussed herein. The two layers may be the same or different (e.g., as in an A/B/C structure). The layers may comprise, for example, a metal, wood, a ceramic, a polymer, etc., including any of those described herein. As a non-limiting example, in one embodiment, a composite can include two substantially metallic layers sandwiching a plurality of discontinuous fibers substantially transversely aligned to the metallic layers.

It should be understood, however, that in other embodiments, other numbers of layers may be present. For example, a composite may contain, 3, 4, 5, or more layers including metals, wood, ceramics, polymers, etc., and/or 2, 3, 4, 5, etc. layers of discontinuous fibers. Some or all of these layers may comprise substantially transversely aligned discontinuous fibers. For example, in one embodiment, the composite may include three layers of, e.g., metals, wood, ceramics, polymers, etc., containing or sandwiching two layers of discontinuous fibers. The layers of material and discontinuous fibers may be the same, e.g., forming structures such as A/B/A/B, A/B/A/B/A, A/B/A/B/A/B, A/B/A/B/A/B/A, etc., or one or more of these may be different (for example, as in an A/B/C/B structure). These patterns, or other patterns, may be extended in still other embodiments.

A variety of materials may be used for the substrate. For example, one or more layers within a composite may include layers or substrates comprising polymers, composite materials, metals, wood, ceramics, or the like, e.g., as discussed in more detail below. In addition, in some cases, a substrate or layer within a composite will comprise more than one of these materials, and/or other materials. For instance, a substrate or layer may comprise a plurality of polymers, composite materials, metals, wood, ceramics, or the like. The substrate or layer may be a solid sheet of material (e.g., sheet metal), or may be formed from continuous fibers such as discussed herein. Other structures are also possible.

In some cases, the composite may be consolidated with another composite layer to form a composite structure. If more than one substrate is present in a composite, the substrates may independently be the same or different, e.g., the first layer and the second layer have substantially the same composition, or different compositions in some embodiments. There may be 1, 2, 3, 4, 5, or any other suitable number of substrates that are present.

For example, in one set of embodiments, a layer or a substrate of material within a composite may comprise a metal. In some cases, at least 50 wt %, at least 60 wt %, at least 70 wt %, at least 75 wt %, at least 80 wt %, at least 85 wt %, at least 90 wt %, or at least 95% of the layer may comprise a metal. In certain cases, a layer may be substantially metallic. In some embodiments, at least 5%, at least 10%, at least 15%, at least 20%, at least 25%, at least 30%, at least 40%, at least 50%, at least 50%, at least 70%, at least 80%, at least 90%, at least 95%, at least 97%, or at least 99% by volume of the substrate (without the discontinuous fibers) may be a metal.

Examples of metals that may be present include, but are not limited to, steel, aluminum, iron, titanium, or the like. For instance, a layer may comprise at least 50 wt %, at least 60 wt %, at least 70 wt %, at least 80 wt %, etc. of a metal such as steel, aluminum, iron, titanium, or the like. In some cases, more than one metal may be present in a layer, e.g., as in a metal alloy, including any of these and/or other metals. For instance, the alloy may be an alloy of steel, aluminum, iron, titanium, or the like. Non-limiting examples of aluminum alloys that could be used include 1000-series, 2000-series, 3000-series, 4000-series, 5000-series, 6000-series, 7000-series, or 8000-series aluminum alloys.

In another set of embodiments, a layer or a substrate comprises a polymer, such as a thermoplastic or a thermoset. In some cases, the substrate consists essentially of a polymer. In some cases, at least 50 wt %, at least 60 wt %, at least 70 wt %, at least 75 wt %, at least 80 wt %, at least 85 wt %, at least 90 wt %, or at least 95% of the layer may comprise a polymer. In certain cases, a layer may be substantially polymeric. In some embodiments, at least 5%, at least 10%, at least 15%, at least 20%, at least 25%, at least 30%, at least 40%, at least 50%, at least 50%, at least 70%, at least 80%, at least 90%, at least 95%, at least 97%, or at least 99% by volume of the substrate (without the discontinuous fibers) may be a polymer.

The substrate may include one or more polymers, including the following polymers, and may also include other polymers, in addition to or instead of these polymers. Examples of suitable polymers for the substrate include, but are not limited to, polyimide (PI), polyamide-imide (PAI), polyetheretherketone (PEEK), polyetherketone (PEK), polyphenylesulfone (PPSU), polyethersulfone (PES), polyetherimide (PEI), polysulfone (PSU), polyphenylene sulfide (PPS), polyvinylidene fluoride (PVDF), polytetrafluoroethylene (PTFE), perfluoroalkoxy alkanes (PFA), polyamide 46 (PA46), polyamide 66 (PA66), polyamide 12 (PA12), polyamide 11 (PA11), polyamide 6 (PA6), polyamide 6.6 (PA6.6), polyamide 6.6/6 (PA6.6/6), amorphous polyamide (PA6-3-T), polyethylene terephthalate (PET), polyphthalamide (PPA), liquid crystal polymer (LCP), polycarbonate (PC), polybutylene terephthalate (PBT), polyoxymethylene (POM), polyphenyl ether (PPE), polymethyl methacrylate (PMMA), polypropylene (PP), polyethylene (PE), high density polyethylene (HDPE), acrylonitrile styrene acrylate (ASA), styrene acrylonitrile (SAN), acrylonitrile butadiene styrene (ABS), polybenzimidazole (PBI), polyvinyl chloride (PVC), poly-para-phenylene-copolymer (PPP), polyacrylonitrile, polyethylenimine, polyetherketonetherketoneketone (PEKEKK), ethylene tetrafluoroethylene (ETFE), polychlorotrifluoroethylene (PCTFE), and/or polymethylpentene (PMP).

In certain embodiments, a layer or a substrate can comprise a ceramic. In some cases, the substrate consists essentially of a ceramic. In some cases, at least 50 wt %, at least 60 wt %, at least 70 wt %, at least 75 wt %, at least 80 wt %, at least 85 wt %, at least 90 wt %, or at least 95% of the layer may comprise a ceramic. In certain cases, a layer may be substantially ceramic. In some embodiments, at least 5%, at least 10%, at least 15%, at least 20%, at least 25%, at least 30%, at least 40%, at least 50%, at least 50%, at least 70%, at least 80%, at least 90%, at least 95%, at least 97%, or at least 99% by volume of the substrate (without the discontinuous fibers) may be a ceramic.

Non-limiting examples of ceramics include, but are not limited to, siloxane, a silazane, a carbosilane, or the like. In some cases, the ceramic is a silicon-containing ceramic. Other examples of ceramics include, but are not limited to, alumina, silicon carbide, aluminum nitride, silicon nitride, zirconia, mullite, hafnium diboride, zirconium diboride, hafnium nitride, zirconium nitride, titanium carbide, titanium nitride, thorium dioxide, tantalum carbide, etc.

Certain embodiments are generally directed to composites comprising substrates formed from continuous fibers, and containing a plurality of discontinuous fibers. The fibers may include, for example, one or more layers comprising polymers, metals, wood, ceramics, or the like. The continuous fibers generally have a length that on average is substantially longer than the cross-sectional dimension of the discontinuous fibers. For instance, the continuous fibers may have an average length that is greater than 10, greater than 30, greater than 50, greater than 100, greater than 300, greater than 500, or greater than 1,000 times the cross-sectional dimension of the discontinuous fibers. In some embodiments, the continuous fibers have an average aspect ratio (e.g., of length to diameter or average cross-sectional dimension) of at least 3, at least 5, at least 10, at least 30, at least 50, at least 100, at least 300, at least 500, at least 1,000, etc. Additionally, in certain cases, the continuous fibers may have an average length of at least 5 mm, at least 1 cm, at least 3 cm, at least 5 cm, or at least 10 cm. Longer average lengths are also possible in some instances.

The continuous fibers may be woven together (e.g. bidirectional, multidirectional, quasi-isotropic, etc.), and/or non-woven (e.g., unidirectional, veil, mat, etc.). In certain embodiments, at least some of the continuous fibers are substantially parallel, and/or orthogonally oriented relative to each other, although other configurations of continuous fibers are also possible. In certain embodiments, the continuous fibers may together define a fabric or other substrate, e.g., a textile, a tow, a filament, a yarn, a strand, or the like. In some cases, the substrate may have one orthogonal dimension that is substantially less than the other orthogonal dimensions (i.e., the substrate may have a thickness).

The continuous fibers forming the substrate may comprise any of a wide variety of materials, and one type or more than one type of fiber may be present within the substrate. Non-limiting examples include carbon, basalt, silicon carbide, aramid, zirconia, nylon, boron, alumina, silica, borosilicate, mullite, cotton, or any other natural or synthetic fibers.

The continuous fibers may have any suitable average diameter. For example, the continuous fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the continuous fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the continuous fibers may have an average diameter of between 10 micrometers and 100 micrometers, between 50 micrometers and 500 micrometers, between 100 micrometers and 5 mm, etc.

The continuous fibers may also have any suitable average length. For example, the continuous fibers may have an average length of at least about 0.5 cm, at least 1 cm, at least 2 cm, at least 3 cm, at least 5 cm, at least 10 cm, etc. In certain embodiments, the continuous fibers may have an average diameter of no more than 10 cm, no more than 5 cm, no more than 3 cm, no more than 2 cm, no more than 1 cm, no more than 0.5 cm, or the like. Combinations of any of these are also possible; for example, the continuous fibers may have an average length of between 1 cm and 10 cm, between 10 cm and 100 cm, etc.

In some instances, the continuous fibers may comprise a relatively large portion of the composite. For example, in certain embodiments, the continuous fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass of the composite. In some cases, the continuous fibers comprise no more than 97%, no more than 95%, no more than 93%, no more than 91%, no more than 90%, no more than 85%, no more than 80%, no more than 70%, no more than 60%, no more than 50%, no more than 40%, no more than 30%, no more than 20%, or no more than 10% of the mass of the composite. Combinations of any of these are also possible.

In some embodiments, a layer or a substrate comprises a material such as a thermoset, thermoplastic, and/or a vitrimer. Additional non-limiting examples of materials that may be present in a layer or substrate binders include an epoxy, polyester, vinyl ester, polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, a silicone rubber, polyvinylidene fluoride, styrene butadiene rubber, or a pre-ceramic monomer, a siloxane, a silazane, or a carbosilane. In some cases, a layer or substrate may comprise a covalent network polymer prepared from an imine-linked oligomer and an independent crosslinker comprising a reactive moiety. Non-limiting examples of reactive moieties include epoxy, isocyanate, bismaleimide, sulfide, polyurethane, anhydride, and/or polyester. Examples of vitrimers include, but are not limited to, epoxy resins based on diglycidyl ether of bisphenol A, aromatic polyesters, polylactic acid (polylactide), polyhydroxyurethanes, epoxidized soybean oil with citric acid, polybutadiene, etc.

In addition, as mentioned, a substrate or layer within a composite may comprise more than one of these materials, and/or other materials, in other embodiments. For instance, a substrate or layer may comprise a plurality of polymers, composite materials, metals, wood, ceramics, or the like. If more than one substrate or layer is present within a composite, these may independently be the same or different.

A composite may also contain one or more discontinuous fibers in some aspects. These may be present anywhere in the composite, for example, contained or embedded within the substrate, or at least a portion thereof. In some cases, the discontinuous fibers may be substantially aligned within the composite, e.g., forming a layer within the composite. In some cases, at least 50%, at least 70%, at least 80%, at least 90%, at least 95%, at least 97%, or at least 99% by volume of the substrate may contain discontinuous fibers.

The discontinuous fibers may be formed or include any of a wide variety of materials, and one or more than one type of material may be present. For example, the discontinuous fibers may comprise materials such as carbon (e.g., carbon fibers), basalt, silicon carbide, silicon nitride, aramid, zirconia, nylon, boron, alumina, silica, borosilicate, mullite, nitride, boron nitride, graphite, glass, a polymer (including any of those described herein), or the like. The discontinuous fibers may include any natural and/or any synthetic material, and may be magnetic and/or non-magnetic.

The discontinuous fibers, in some embodiments, may be at least substantially aligned within the composite. Methods for aligning discontinuous fibers are discussed in more detail herein. Various alignments are possible, and in some cases, can be determined optically or microscopically, e.g. Thus, in some cases, the alignment may be determined qualitatively. However, it should be understood that the alignment need not be perfect. In some cases, at least 5%, at least 10%, at least 25%, at least 50%, at least 75%, at least 85%, at least 90%, or at least 95% of the fibers within a composite may exhibit an alignment that is within 20°, within 15°, within 10°, or within 5° of the average alignment of the plurality of the fibers, e.g., within a sample of the composite. In some cases, the average alignment of the fibers may be oriented to be at least 60°, at least 65°, at least 70°, at least 75°, at least 85°, or at least 87° relative to the plane of the substrate at that location.

Without wishing to be bound by any theory, it is believed that alignment of the discontinuous fibers substantially orthogonal to the substrate may serve to provide reinforcement of the substrate. This may improve the strength of the substrate, e.g., when subjected to forces in different directions. For instance, fibers within the substrate may run in substantially orthogonal directions in 3 dimensions, thereby providing strength to the substrate regardless of the direction of force that is applied. The fibers may also limit degradation of the surface, e.g., with interlaminar micro-cracks, through-ply fissures, or the like. In addition, in some embodiments, the fibers may enhance other properties of the substrate, e.g., electrical and/or thermal properties within the composite, in addition to or instead of its mechanical properties.

While others have suggested packing fibers in a substrate, it is believed that higher fiber volume fractions were previously unachievable, e.g., due to higher electrostatic interactions that cause fiber agglomeration, and/or higher viscosities of polymer resins that can prevent consistent dispersion. Accordingly, certain embodiments are generally directed to fiber volume fractions (e.g., of substantially aligned fibers such as those discussed herein) of at least 40% fiber volume, at least 45% fiber volume, at least 50% fiber volume, at least 55% fiber volume, at least 60% fiber volume, at least 65% fiber volume, at least 70% fiber volume, etc.

A variety of techniques may be used to align the discontinuous fibers in various embodiments, including magnetic fields, shear flow, or the like, as are discussed in more detail below. As a non-limiting example, magnetic particles, including those discussed herein, can be attached to the fibers, and a magnetic field may then be used to manipulate the magnetic particles. For instance, the magnetic field may be used to move the magnetic particles into the substrate, and/or to align the discontinuous fibers within the substrate. The magnetic field may be constant or time-varying (e.g., oscillating), for instance, as is discussed herein. For example, an applied magnetic field may have a frequency of 1 Hz to 500 Hz and an amplitude of 0.01 T to 10 T. Other examples of magnetic fields are described in more detail below.

In some cases, the discontinuous fibers may have an average length, or characteristic dimension, of at least 1 nm, at least 3 nm, at least 5 nm, at least 10 nm, at least 30 nm, at least 50 nm, at least 100 nm, at least 300 nm, at least 500 nm, at least 1 micrometer, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 10 mm, at least 15 mm, etc. In certain embodiments, the discontinuous fibers may have an average length, or characteristic dimension, of no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, no more than 5 micrometers, no more than 3 micrometers, no more than 1 micrometers, no more than 500 nm, no more than 300 nm, no more than 100 nm, no more than 50 nm, no more than 30 nm, no more than 10 nm, no more than 5 nm, etc. Combinations of any of these are also possible. For example, the discontinuous fibers within a composite may have an average length of between 1 mm and 5 mm.

In addition, the discontinuous fibers may also have any suitable average diameter. For instance, the discontinuous fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the discontinuous fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the discontinuous fibers may have an average diameter of between 10 micrometers and 100 micrometers, between 50 micrometers and 500 micrometers, between 100 micrometers and 5 mm, etc.

In certain embodiments, the discontinuous fibers may have a length that is at least 10 times or at least 50 times its thickness or diameter, on average. In some cases, the fibers within a composite may have an average aspect ratio (ratio of fiber length to diameter or thickness) of at least 3, at least 5, at least 10, at least 30, at least 50, at least 100, at least 300, at least 500, at least 1,000, at least 3,000, at least 5,000, at least 10,000, at least 30,000, at least 50,000, or at least 100,000. In some cases, the average aspect ratio may be less than 100,000, less than 50,000, less than 30,000, less than 10,000, less than 5,000, less than 3,000, less than 1,000, less than 500, less than 300, less than 100, less than 50, less than 30, less than 10, less than 5, etc. Combinations of any of these are also possible in some cases; for instance, the aspect ratio may be between 5, and 100,000.

In some instances, the discontinuous fibers may comprise a relatively large portion of the composite. For example, in certain embodiments, the discontinuous fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass or volume of the composite. In some cases, the discontinuous fibers comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass or volume of the composite. Combinations of any of these are also possible.

At least some of the discontinuous fibers may be uncoated. In some cases, however, some or all of the discontinuous fibers may be coated. The coating may be used, for example, to facilitate the adsorption or binding of particles, such as magnetic particles, onto the fibers, or for other reasons.

As one example, at least some of the discontinuous fibers are coated with sizing. Some examples of sizings include, but are not limited to, polypropylene, polyurethane, polyamide, phenoxy, polyimide, epoxy, or the like. These sizings can be introduced into the slurry, for example, as a solution, dispersion, emulsion, etc. As other examples, the fibers may be coated with a surfactant, a silane coupling agent, an epoxy, glycerine, polyurethane, an organometallic coupling agent, or the like. Non-limiting examples of surfactants include oleic acid, sodium dodecyl sulfate, sodium lauryl sulfate, etc. Non-limiting examples of silane coupling agents include amino-, benzylamino-, chloropropyl-, disulfide-, epoxy-, epoxy/melamine-, mercapto-, methacrylate-, tertasulfido-, ureido-, vinyl-, isocynate-, and vinly-benzyl-amino-based silane coupling agents. Non-limiting examples of organometallic coupling agents include aryl- and vinyl-based organometallic coupling agents.

As mentioned, in one set of embodiments, at least some of the discontinuous fibers may be carbon fibers. The carbon fibers may be aligned in a magnetic field directly or indirectly, e.g., using magnetic particles such as those discussed herein. For instance, some types of carbon fibers are diamagnetic, and can be directly moved using an applied magnetic field. Thus, certain embodiments are directed to fibers or composites that are substantially free of paramagnetic or ferromagnetic materials could still be aligned using an external magnetic field. For example, if any paramagnetic or ferromagnetic materials are present, they may form less than 5%, less than 1%, less than 0.5%, less than 0.3%, less than 0.1%, less than 0.05%, less than 0.03%, less than 0.01%, less than 0.005%, less than 0.003%, or less than 0.001% (by mass) of the material.

A variety of carbon fibers may be obtained commercially, including diamagnetic carbon fibers. In some cases, carbon fibers can be produced from polymer precursors such as polyacrylonitrile (PAN), rayon, pitch, or the like. In some cases, carbon fibers can be spun into filament yarns, e.g., using chemical or mechanical processes to initially align the polymer atoms in a way to enhance the final physical properties of the completed carbon fibers. Precursor compositions and mechanical processes used during spinning filament yarns may vary. After drawing or spinning, the polymer filament yarns can be heated to drive off non-carbon atoms (carbonization or pyrolization), to produce final carbon fiber. In some embodiments, such techniques may be used to produce carbon fiber with relatively high carbon content, e.g., at least 90%, or other contents as described herein.

Non-limiting examples of carbon fibers include, for instance, pitch- and/or polymer-based (e.g. ex-PAN or ex-Rayon) variants, including those commercially-available. In some cases, these may include intermediate/standard modulus (greater than 200 GPa) carbon fibers, high modulus (greater than 300 GPa), or ultra-high modulus (greater than 500 GPa) carbon fibers.

In one set of embodiments, the carbon fibers have a relatively high carbon content. Without wishing to be bound by any theory, it is believed that such fibers may exhibit diamagnetic properties that allows them to be oriented with low-energy magnetic fields. In general, diamagnetism is the repulsion of a material to an applied magnetic field by generation of an induced magnetic field that is opposite in direction to the applied magnetic field. A material is typically categorized as diamagnetic if it lacks noticeable paramagnetic or ferromagnet contributions to the overall magnetic response. In many cases, the magnetic response of diamagnetic materials is very weak and negligible. However, relatively high magnetic fields can induce a noticeable physical response in such diamagnetic materials.

Thus, in some cases, carbon fibers exhibiting relatively highly-oriented molecular structures may exhibit anisotropic, high-diamagnetism diamagnetic properties. Such diamagnetic properties may allow them to be oriented with relatively weak magnetic fields, such as is described herein. For example, in one set of embodiments, an applied magnetic field may generate a strong induced magnetic field in the C—C bonds of a carbon fiber in the opposite direction of the applied magnetic field. Certain types of carbon fibers may possess a high degree of C—C bonds parallel to the in-fiber direction, which may create an anisotropic diamagnetic response. Thus, such carbon fibers can be subjected to a magnetic torque that is neutralized when the carbon fiber aligns fully-parallel to the applied magnetic field. Accordingly, by applying a suitable magnetic field, the carbon fibers may be aligned due to such diamagnetic properties. This response may be sufficient to overcome gravitational, viscous, and/or interparticle steric effects.

For instance, in certain embodiments, the carbon fibers may have a carbon content of greater than 80%, greater than 90%, greater than 92%, greater than 94%, greater than 95%, greater than 96%, greater than 97%, greater than 98% greater than 99%, or greater than 99.5% by mass. Such carbon fibers may be obtained commercially in some cases.

For example, the carbon fibers may be produced pyrolytically e.g., by "burning" or oxidizing other components that can be removed (e.g., by turning into a gas), leaving behind a carbon fiber with a relatively high carbon content. Other methods of making carbon fibers are also possible, e.g., as discussed in detail herein.

The carbon fibers may also exhibit substantial alignment of the C—C bonds within the carbon fibers in some instances. For instance, at least 50%, at least 60%, at least 70%, at least 75%, at least 80%, at least 85%, at least 90%, or at least 95% of the carbon fibers may exhibit substantial alignment of the C—C bonds. Such alignment may be determined, for example, using wide angle x-ray diffraction (WAXD), or other techniques known to those of ordinary skill in the art.

In one set of embodiments, the carbon fibers may have a relatively high modulus (tensile modulus, which is a measure of stiffness). Typically, higher modulus fibers are stiffer and lighter than low modulus fibers. Carbon fibers typically have a higher modulus when force is applied parallel to the fibers, i.e., the carbon fibers are anisotropic. In some embodiments, the carbon fibers may have a modulus (e.g., when force is applied parallel to the fibers) of at least 100 GPa, at least 200 GPa, at least 300 GPa, at least 400 GPa, at least 500 GPa, at least 600 GPa, at least 700 GPa, etc. It is believed that more flexible carbon fibers may exhibit less alignment, i.e., carbon fibers having a low modulus may have subtle physical responses to magnetic fields, or have no response, rather than align within an applied magnetic field.

In one set of embodiments, the carbon fibers may exhibit an anisotropic diamagnetic response when free-floating within a liquid (e.g., water, oil, polymer resin, polymer melt, metal melt, an alcohol such as ethanol, or another volatile organic compound), and a magnetic field is applied. For example, in some cases, the carbon fibers may align when a suitable magnetic field is applied, i.e., indicative of a diamagnetic response. In some cases, the magnetic field may be at least 100 mT, at least 200 mT, at least 300 mT, at least 500 mT, at least 750 mT, at least 1 T, at least 1.5 T, at least 2 T, at least 3 T, at least 4 T, at least 5 T, at least 10 T, etc. In some cases, at least 30%, at least 40%, at least 50%, at least 60%, at least 70%, at least 80%, or at least 90%, of the free-floating carbon fibers within the liquid may exhibit alignment when a suitable magnetic field is applied.

Typically, a carbon fiber has a shape such that one orthogonal dimension (e.g., its length) is substantially greater than its other two orthogonal dimensions (e.g., its width or thickness). The fiber may be substantially cylindrical in some cases. As mentioned, the carbon fibers may be relatively stiff, in some instances; however, a carbon fiber need not be perfectly straight (e.g., its length may still be determined along the fiber itself, even if it is curved).

In one set of embodiments, the carbon fiber may have a dimension (e.g., a characteristic dimension) that is substantially the same, or smaller, than the thickness of the substrate. For example, at least some carbon fibers within a composite may have an average length that substantially spans the thickness of the substrate. However, in other cases, the characteristic dimension of the carbon fiber may be greater than the thickness.

As mentioned, in one set of embodiments, particles such as magnetic particles may be added, for example, to align the discontinuous fibers, or for other applications. The particles may be adsorbed or otherwise bound to at least some of the discontinuous fibers. In some cases, the particles may coat some or all of the discontinuous fibers and/or the continuous fibers. This may be facilitated by a coating of material as discussed herein, although a coating is not necessarily required to facilitate the adsorption of the particles.

If the particles are magnetic, the particles may comprise any of a wide variety of magnetically susceptible materials. For example, the magnetic materials may comprise one or more ferromagnetic materials, e.g., containing iron, nickel, cobalt, alnico, oxides of iron, nickel, cobalt, rare earth metals, or an alloy including two or more of these and/or other suitable ferromagnetic materials. In some cases, the magnetic particles may have a relative permeability of at least 2, at least 5, at least 10, at least 20, at least 40, at least 100, at least 200, at least 500, at least 1,000, at least 2,000, at least 5,000, or at least 10,000.

However, it should be understood that not all of the particles are necessarily magnetic. In some cases, non-magnetic particles may be used, e.g., in addition to and/or instead of magnetic particles. Non-limiting examples of nonmagnetic particles include glass, polymer, metal, or the like.

The particles (if present) may be spherical or non-spherical, and may be of any suitable shape or size. The particles may be relatively monodisperse or come in a range of sizes. In some cases, the particles may have a characteristic dimension, on average, of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 1.5 cm, at least 2 cm, at least 3 cm, at least 5 cm, at least 10 cm, etc. The particles within the composite may also have an average characteristic dimension of no more than 10 cm, no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the particles may exhibit a characteristic dimension of or between 100 micrometer and 1 mm, between 10 micrometer and 10 micrometer, etc. The characteristic dimension of a non-spherical particle may be taken as the diameter of a perfect sphere having the same volume as the nonspherical particle.

In some embodiments, the particles (including magnetic and/or non-magnetic particles) may comprise a relatively large portion of the composite. For example, in certain embodiments, the particles may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the volume of the composite. In some cases, the particles comprise no more than 97%, no more than 95%, no more than 90%, no more than 85%, no more than 80%, no more than 70%, no more than 60%, no more than 50%, no more than 45%, no more than 40%, no more than 35% no more than 30%, no more than 25%, no more than 20%, no more than 15%, no more than 10%, no more than 7%, no more than 5%, no more than 4%, no more than 3%, no more than 2%, or no more than 1% of the volume of the composite. Combinations of any of these are also possible.

As discussed, one set of embodiments are generally directed to composite materials. In some cases, the composite is generally planar. However, it should be understood that such a substrate need not be a mathematically-perfect planar structure (although it can be); for instance, the substrate may also be deformable, curved, bent, folded, rolled, creased, or the like. As examples, the substrate may have an average thickness of at least about 0.1 micrometers, at least about 0.2 micrometers, at least about 0.3 micrometers, at least about 0.5 micrometers, at least about 1 micrometer, at least about 2 micrometers, at least about 3 micrometers, at least about 5 micrometers, at least about 10 micrometers, at least about 30 micrometers, at least about 50 micrometers, at least about 100 micrometers, at least about 300 micrometers, at least about 500 micrometers, at least about 1 mm, at least about 2 mm, at least about 3 mm, at least about 5 mm, at least about 1 cm, at least about 3 cm, at least about 5 cm, at least about 10 cm, at least about 30 cm, at least about 50 cm, at least about 100 cm, etc. In certain instances, the average thickness may be less than 100 cm, less than 50 cm, less than 30 cm, less than 10 cm, less than 5 cm, less than 3 cm, less than 1 cm, less than 5 mm, less than 2 mm, less than 3 mm, less than 1 mm, less than 500 micrometers, less than 300 micrometers, less than 100 micrometers, less than 50 micrometers, less than 30 micrometers, less than 10 micrometers, less than 5 micrometers, less than 3 micrometers, less than 1 micrometers, less than 0.5 micrometers, less than 0.3 micrometers, or less than 0.1 micrometers. Combinations of any of these are also possible in certain embodiments. For instance, the average thickness may be between 0.1 and 5,000 microns, between 10 and 2,000 microns, between 50 and 1,000 microns, or the like. The thickness may be uniform or non-uniform across the substrate. Also, the substrate may be rigid (e.g., as discussed herein), or may be deformable in some cases.

In one set of embodiments, a binder is also present within the composite, e.g., which may be used to bind the continuous fibers and the discontinuous fibers, e.g., within the composite. For example, the binder may facilitate holding the continuous fibers and the discontinuous fibers in position within the composite. However, it should be understood that the binder is optional and not required in all cases. In some cases, the binder may comprise a resin. The binder may include, for example, a thermoset, thermoplastic, and/or a vitrimer. In certain embodiments, the binder may comprise a thermoplastic solution, a thermoplastic melt, thermoplastic pellets, a thermoset resin, a volatile compound such as a volatile organic compound, water, or an oil. Additional non-limiting examples of binders include an epoxy, polyester, vinyl ester, polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, a silicone rubber, polyvinylidene fluoride, styrene butadiene rubber, or a pre-ceramic monomer, a siloxane, a silazane, or a carbosilane. In some cases, a binder may comprise a covalent network polymer prepared from an imine-linked oligomer and an independent crosslinker comprising a reactive moiety. Non-limiting examples of reactive moieties include epoxy, isocyanate, bismaleimide, sulfide, polyurethane, anhydride, and/or polyester. Examples of vitrimers include, but are not limited to, epoxy resins based on diglycidyl ether of bisphenol A, aromatic polyesters, polylactic acid (polylactide), polyhydroxyurethanes, epoxidized soybean oil with citric acid, polybutadiene, etc. The binder may also include mixtures including any one or more of these materials and/or other materials, in certain embodiments.

In some embodiments, the binder may comprise at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

Composites may be used in a wide variety of applications. As non-limiting examples, composites may be used in diverse applications such as reinforcement for pressure vessels, components for wind turbines, shims used in jacking heavy structures, sporting equipment (e.g., golf clubs, tennis rackets, bike frames, etc.), building or construction materials, laminates or encapsulants for electronic devices, battery components, or panels for vehicles such as automobiles, aircraft, marine vehicles, or spacecraft. In some cases, the composites may be useful for eliminating or reducing stress concentrations or delamination within materials, stiffening materials, eliminating or reducing surface wear, dissipating electrical shocks, transmitting electrical signals, attenuating or transmitting electromagnetic waves, dissipating thermal shocks, eliminating or reducing thermal gradients, as components for energy storage applications, or as components for carbon fibers or ceramic matrixes.

Another aspect is generally directed to systems and methods for making composites such as those described herein. In one set of embodiments, composites can be prepared from a liquid. The liquid may be, for example, a slurry, a solution, an emulsion, or the like. The liquid may contain discontinuous fibers such as discussed herein, and may be applied to a substrate. The fibers may then be aligned as discussed herein, and the liquid may be then be removed to create a fiber-containing substrate. After alignment, the final composite may be formed, for example, by applying heat (for example, to remove the liquid), and/or pressure (for example, to embed the fibers into the substrate). In some cases, the composite can be set or hardened, e.g., with a binder, which may be used to immobilize or fix the discontinuous agents within the substrate. The composite may be relatively stiff or flexible in various embodiments. For instance, in one set of embodiments, the composite may be wound into a continuous roll. In some cases, a liquid, such as a slurry, may be used. The slurry may include the discontinuous fibers and optionally, magnetic particles or other components to be applied to the substrate.

In one set of embodiments, the liquid is able to neutralize the electrostatic interactions between the discontinuous fibers, for example using aqueous liquids. This may be useful, for example, to allow the discontinuous fibers to be dispersed within the liquid at relatively high fiber volumes without agglomeration. In some cases, surfactants and/or alcohols can be introduced into the slurry to reduce electrostatic interactions between the fibers. High shear mixing and flow also may help reduce agglomeration/flocculation in certain cases.

In some embodiments, the liquid phase may include, for example, a thermoplastic or a thermoset, e.g., a thermoplastic solution, thermoplastic melt, thermoset, volatile organic compound, water, or oil. Non-limiting examples of thermosets include polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, polyvinylidene fluoride, phenolics, epoxies, bismaleimides, cyanate esters, polyimides, etc. Non-limiting examples of elastomers include silicone rubber and styrene butadiene rubber, etc. Non-limiting examples of thermoplastics include epoxy, polyester, vinyl ester, polycarbonates, polyamides (e.g., nylon, PA-6, PA-12, etc.), polyphenylene sulfide, polyetherimide, polyetheretherketone, polyetherketoneketone, etc. Non-limiting examples of ceramic monomers include a siloxane, a silazane, or a carbosilane, etc. In some cases, for example, one or more of these may be added to assist in homogenously dispersing the discontinuous fibers within the liquid. Examples of volatile organic compounds include, but are not limited to, isopropanol, butanol, ethanol, acetone, toluene, or xylenes.

Any suitable amount of discontinuous fiber may be present in the slurry or other liquid. For instance, at least 10%, at least 15%, at least 20%, at least 25%, at least 30%, at least 35%, at least 40%, at least 45%, at least 50%, at least 55%, at least 60%, at least 65%, at least 70%, at least 75%, or at least 80% of the volume of the slurry may be discontinuous fiber. In some cases, no more than 85%, no more than 80%, no more than 75%, no more than 70%, no more than 65%, no more than 60%, no more than 55%, no more than 50%, no more than 45%, no more than 40%, no more than 35%, no more than 30%, no more than 25%, no more than 20%, no more than 15%, or no more than 10% may be discontinuous fiber. Combinations of any of these are also possible in some cases. For example, a slurry or other liquid may contain between 70% and 80%, between 75% and 85%, between 50% and 90%, etc. discontinuous fiber.

After preparation of the slurry or other liquid, it may be applied to or exposed to the substrate. Any suitable method may be used to apply the slurry or other liquid to the substrate. As non-limiting examples, the liquid may be poured, coated, sprayed, or painted onto the substrate, or the substrate may be immersed partially or completely within the liquid. The liquid may be used to wet, coat, and/or surround the substrate.

A magnetic field may be applied to manipulate the discontinuous fibers, directly or indirectly, as discussed herein, according to one set of embodiments. Any suitable magnetic field may be applied. In some cases, the magnetic field is a constant magnetic field. In other cases, the magnetic field may be time-varying; for example, the magnetic field may oscillate or periodically change in amplitude and/or direction, e.g., to facilitate manipulation of the discontinuous agents. The oscillation may be sinusoidal or another repeating waveform (e.g., square wave or sawtooth). The frequency may be, for example, at least 0.1 Hz, at least 0.3 Hz, at least 0.5 Hz, at least 1 Hz, at least 3 Hz, at least 5 Hz, at least 10 Hz, at least 30 Hz, at least 50 Hz, at least 100 Hz, at least 300 Hz, at least 500 Hz, etc., and/or no more than 1000 Hz, no more than 500 Hz, no more than 300 Hz, no more than 100 Hz, no more than 50 Hz, no more than 30 Hz, no more than 10 Hz, no more than 5 Hz, no more than 3 Hz, etc. For example, the frequency may be between 1 Hz to 500 Hz, between 10 Hz and 30 Hz, between 50 Hz and Hz, or the like. In addition, the frequency may be held substantially constant, or the frequency may vary in some cases.

The magnetic field, whether constant or oscillating, may have any suitable amplitude. For example, the amplitude may be at least 0.001 T, at least 0.003 T, at least 0.005 T, at least 0.01 T, at least 0.03 T, at least 0.05 T, at least 0.1 T, at least 0.3 T, at least 0.5 T, at least 1 T, at least 3 T, at least 5 T, at least 10 T, etc. The amplitude in some cases may be no more than 20 T, no more than 10 T, no more than 5 T, no more than 3 T, no more than 1 T, no more than 0.5 T, no more than 0.3 T, no more than 0.1 T, no more than 0.05 T, no more than 0.03 T, no more than 0.01 T, no more than 0.005 T, no more than 0.003 T, etc. The amplitude may also fall within any combination of these values. For instance, the amplitude may be between 0.01 T to 10 T, between 1 T and 3 T, between 0.5 T and 1 T, or the like. The amplitude may be substantially constant, or may vary in certain embodiments, e.g., within any range of these values.

In some embodiments, the magnetic field direction (i.e., direction of maximum amplitude) may vary by +/−90°, +/−85°, +/−80°, +/−75°, +/−70°, +/−65°, +/−60°, +/−55°, +/−50°, +/−45°, +/−40°, +/−35°, +/−30°, +/−25°, +/−20°, +/−15°, +/−10°, +/−5° about a mean direction.

A variety of different devices for producing suitable magnetic fields may be obtained commercially, and include permanent magnets or electromagnets. In some cases, an oscillating magnetic may be created by attaching a magnet to a rotating disc and rotating the disc at an appropriate speed or frequency. Non-limiting examples of permanent magnets include iron magnets, alnico magnets, rare earth magnets, or the like.

In one set of embodiments, shear flow may be used to align or manipulate the discontinuous fibers. For example, a shearing fluid may be applied to the substrate to cause at least some of the plurality of discontinuous agents to align, e.g., in the direction of shear flow. Examples of shearing fluids that may be used include water, or another liquid, such as oil, an alcohol such as ethanol, an organic solvent (e.g., such as isopropanol, butanol, ethanol, acetone, toluene, or xylenes), or the like. In certain embodiments, the shearing fluid may have a viscosity of at least 1 cP. In addition, in some cases, the shearing fluid may be a gas, such as air. The linear flow rate of the shearing fluid, may be, for example, at least 10 mm/min, at least 20 mm/min, at least 30 mm/min, at least 50 mm/min, at least 100 mm/min, at least 200 mm/min, at least 300 mm/min, etc.

For example, in one set of embodiments, the fibers can be added to a liquid, including alcohol, solvent, or resin, to form a slurry. The slurry can be flowed to align the fibers in some cases, e.g., wherein the slurry is used as a shearing fluid. In other cases, however, the slurry may first be applied to a substrate, then a shearing fluid used to align the fibers.

In addition, in some embodiments, mechanical vibration may be used to manipulate the discontinuous fibers, e.g., in addition to and/or instead of magnetic manipulation. For example, mechanical vibration can be used to move discontinuous fibers into the substrate, e.g., into pores or holes within the substrate, and/or at least substantially align the discontinuous agents within the substrate, e.g., as discussed herein. In one set of embodiments, mechanical vibration may be applied to cause motion of the discontinuous fibers of at least 1 micrometer, at least 2 micrometers, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1,000 micrometers, at least 2,000 micrometers, at least 3,000 micrometers, at least 5,000 micrometers, or at least 10,000 micrometers.

In addition, in some cases, the mechanical vibrations may be time-varying; for example, the mechanical vibrations may periodically change in amplitude and/or direction, e.g., to facilitate manipulation of the discontinuous fibers. The oscillation may be sinusoidal or another repeating waveform (e.g., square wave or sawtooth). The frequency may be, for example, at least 0.1 Hz, at least 0.3 Hz, at least 0.5 Hz, at least 1 Hz, at least 3 Hz, at least 5 Hz, at least 10 Hz, at least 30 Hz, at least 50 Hz, at least 100 Hz, at least 300 Hz, at least 500 Hz, etc., and/or no more than 1000 Hz, no more than 500

Hz, no more than 300 Hz, no more than 100 Hz, no more than 50 Hz, no more than 30 Hz, no more than 10 Hz, no more than 5 Hz, no more than 3 Hz, etc. For example, the frequency may be between 1 Hz to 500 Hz, between 10 Hz and 30 Hz, between 50 Hz and Hz, or the like. In addition, the frequency may be held substantially constant, or the frequency may vary in some cases. If applied in conjunction with an oscillating magnetic field, their frequencies may independently be the same or different.

During and/or after alignment, the discontinuous fibers within the substrate may be set or fixed in some embodiments, e.g., to prevent or limit subsequent movement of the discontinuous fibers and form a relatively hard composite, in one set of embodiments. Non-limiting examples of techniques to form the composite include, but are not limited to solidifying, hardening, gelling, melting, heating, evaporating, freezing, lyophilizing, or pressing the liquid or the slurry. In another set of embodiments, a material, such as a thermosetting polymer, may be cured to harden the composite. The substrate may thus form a composite that is a solid, a gel, or the like.

In some cases, the liquid may comprise a relatively volatile solvent, which can be removed by heating and/or evaporation (e.g., by waiting a suitable amount of time, or allowing the solvent to evaporate, e.g., in a fume hood or other ventilated area). Non-limiting examples of volatile solvents include isopropanol, butanol, ethanol, acetone, toluene, or xylenes. Other examples of methods of removing solvents include applying vacuum, lyophilization, mechanical shaking, or the like.

In one set of embodiments, heating may be applied to the substrate, for example, to dry the liquid or remove a portion of the solvent. For example, the substrate may be heated to a temperature of at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 90° C., at least about 100° C., at least about 125° C., at least about 150° C., at least about 175° C., at least about 200° C., at least about 250° C., at least about 300° C., at least about 350° C., at least about 400° C., at least about 450° C., at least about 500° C., etc. Any suitable method of applying heat may be used, for example, a thermoelectric transducer, an Ohmic heater, a Peltier device, a combustion heater, or the like. In some cases, the viscosity of the liquid may decrease as a result of heating. The heating may be applied, for example, prior, concurrent or subsequent to the application of magnetic field and/or mechanical vibration. In some cases, heating may be used to prevent or initiate cross-linking or curing of a thermosetting prepolymer.

In one set of embodiments, pressure may be applied to the substrate, e.g., to partially or completely embed the discontinuous fibers into the substrate, e.g., to form the composite. In some cases, the pressure may be used to also remove some of the liquid from the substrate. Examples include, but are not limited to, hot-pressing, calendaring, vacuum infusion, or the like. The pressure, may be, for example, at least 15 psi (gauge), at least 30 psi, at least 45 psi, etc. (1 psi=6895 Pa)

A binder may also be applied in one set of embodiments, e.g., before, during, and/or after hardening of the composite and/or removal of at least a portion of the liquid. In some embodiments, the binder may be used to produce a pre-impregnated composite ply material, e.g., by wetting dry ply material. The binder may be a liquid in some cases, and may be caused to harden after application to the composite. In some cases, the binder is permeated into at least a portion of the composite. Non-limiting examples of permeation techniques include using gravitational and capillary forces, by applying pressure to the binder to force it into the composite, or the like. Other examples include, but are not limited to, hot-pressing, calendaring, or vacuum infusion. However, in some cases, the binder is used to coat all, or only a portion of, the substrate, e.g., without necessarily requiring permeation.

In some cases, the binder may comprise a resin. The binder may include a thermoset or a thermoplastic. In certain embodiments, the binder may comprise a thermoplastic solution, a thermoplastic melt, thermoplastic pellets, thermoplastic powders, thermoplastic films, a thermoset resin, a volatile compound such as a volatile organic compound, water, or an oil. Additional non-limiting examples of binders include an epoxy, polyester, vinyl ester, polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, a silicone rubber, polyvinylidene fluoride, polytetrafluoroethylene, perfluoroalkoxy alkanes, styrene butadiene rubber, or a pre-ceramic monomer, such as a siloxane, a silazane, or a carbosilane. The binder may also include mixtures including any one or more of these materials and/or other materials, in certain embodiments.

In some embodiments, the binder may comprise at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

After permeation, the binder may be hardened. In some cases, the binder may harden spontaneously, e.g., upon evaporation of a solvent. In certain embodiments, heat may be applied to harden the binder, e.g., by exposing the composite to temperatures such as those described above. In some embodiments, the binder may be hardened upon exposure to light or a catalyst, e.g., to facilitate or promote a chemical or polymerization reaction to cause the binder to polymerize. For example, a thermosetting polymer may be cured upon exposure to suitable temperatures. In another example, a polymer may be exposed to ultraviolet light to cause polymerization to occur.

The composite, in some cases, may contain additional layers or materials, e.g., in addition to these. For example, the substrate may be one of a number of layers within the composite. Other layers within the composite may include polymers, composite materials, metal, wood, ceramics, or the like. For example, the composite may be consolidated with another composite layer to form a composite structure.

Composites such as those discussed herein may be used in a wide variety of applications, in various aspects. Composites such as those described herein may exhibit a variety of different features in various embodiments. For example, composites such as those discussed herein may be useful for reducing or eliminating stress concentrations, reducing or eliminating delamination, increasing planar strength and/or stiffness, reducing or eliminating surface wear, dissipating electricity (e.g., in electrical shocks), transmitting electrical signals, attenuating electromagnetic waves, transmitting electromagnetic waves, dissipating heat (e.g., in thermal shocks), reducing or eliminating thermal gradients, storing energy, synthesizing ex-PAN carbon fibers, synthesizing ceramic matrix composites (CMC), or the like.

For example, in one set of embodiments, a composite ply with at least three-axes of fiber orientation may be produced. This fiber structure may allow the composite ply to distribute stresses between subsequent plies and adjacent components, which may reduce or eliminate stress concentrations. This may significantly improve the strength of a laminated composite structure under dynamic loads, e.g., when a laminated composite structure is formed with small features or mates with a material with drastically different stiffness (e.g. metal alloys or plastics).

Another set of embodiments is generally directed to a composite ply with through-plane reinforcement of the interlaminar region. This fiber reinforcement allows the composite ply to efficiently distribute stresses between adjacent layers to hinder the formation of cracks and prevents a crack from propagating in the interlaminar region. The targeted reinforcement of the interlaminar region can significantly improve the strength of a laminated composite structure under shock and cyclic loads. This formulation may be useful when a laminated composite structure is formed with long sheets of composite ply, for example, where a single crack in the interlaminar region between the plies can potentially compromise the structural integrity of the overall structure.

Yet another set of embodiments is generally directed to a composite ply with through-plane reinforcement, e.g., a through-plane uni-directional fabric. This fiber reinforcement may reinforce target through-plane loads (e.g. point loads and high-pressure loads). The targeted through-plane reinforcement can significantly improve the strength and stiffness of a laminated composite structure under expected through-plane mechanical loads. This may be useful for effectively handling a composite ply with through-plane reinforcement that can easily deform during handling in an un-cured state while forming an exterior shell for a laminated composite structure.

Still another set of embodiments is generally directed to a composite ply with through-plane oriented carbon fibers. In some cases, the through-plane reinforcement can significantly improve the polymer matrix's resistance to damage from mechanical wear (e.g. abrasion) and/or chemical corrosion (e.g. oxidization). This formulation may be useful, for example, for forming surfaces that protect structures from mechanical and chemical wear.

In one set of embodiments, a composite ply is provided having enhanced through-plane electrical conductivity. This can significantly improve the resistance to damage caused by localized heat generation induced by charge accumulation upon rapid discharge of electrical energy (e.g. lightning). This formulation is particularly useful for forming surfaces that protect structures from damage from electrical discharge. In another set of embodiments, a composite ply with enhanced near-isotropic electrical conductivity is provided. This may effectively conduct electrical signals. In yet another set of embodiments, a composite ply is provided with enhanced isotropic electrical conductivity. This material may effectively attenuate incident electromagnetic waves. In still another set of embodiments, a composite ply is provide having low radio-frequency interference and enhanced through-plane thermal conductivity to effectively transmit electromagnetic waves without overheating.

Another set of embodiments is generally directed to a composite ply with enhanced through-plane thermal conductivity for sufficient structural integrity under heating. This may be useful in some embodiments for increasing structural integrity under rapid temperature fluctuations. Still another set of embodiments is generally directed to a composite ply with through-plane thermal conductivity and low electrical conductivity. This formulation may be useful for effectively moving and distributing heat flux, e.g., in electronics.

Yet another set of embodiments is generally directed to a carbon-based composite ply with through-plane electrical conductivity. This may be useful for adsorbing ionic species from an electrolyte and efficiently distributing electrical charge.

One set of embodiments is generally directed to a composite ply with through-plane carbon fiber catalysts. At appropriate temperatures, a PAN (polyacrylonitrile) matrix may be oxidized and carbonized to form a carbon matrix. Another set of embodiments is generally directed to a composite ply with through-plane carbon fiber or silicon carbide catalysts. At appropriate temperatures, the polymer matrix may be oxidized to form a ceramic matrix.

The following documents are incorporated herein by reference: Int. Pat. Apl. Ser. No. PCT/US2018/021975, filed Mar. 12, 2018, entitled "Fiber-Reinforced Composites, Methods Therefor, And Articles Comprising The Same," published as Int. Pat. Apl. Pub. No. WO 2018/175134; U.S. Pat. Apl. Ser. No. 62/777,438, filed Dec. 10, 2018, entitled "Systems and Methods for Carbon Fiber Alignment and Fiber-Reinforced Composites"; U.S. Pat. Apl. Ser. No. 62/872,686, filed Jul. 10, 2019, entitled "Systems and Methods for Short-Fiber Films and Other Composites"; and U.S. Pat. Apl. Ser. No. 62/938,265, filed Nov. 20, 2019, entitled "Methods and Systems for Forming Composites Comprising Thermosets." In addition, a U.S. patent application, filed on even date herewith, entitled "Systems and Methods for Forming Short-Fiber Films, Composites Comprising Thermosets, and Other Composites," is also incorporated herein by reference in its entirety.

The following examples are intended to illustrate certain embodiments of the present disclosure, but do not exemplify the full scope of the disclosure.

Example 1

FIG. 1 shows a fractured cross-section of a carbon fiber composite with nearly all of the fibers being substantially transversely aligned. FIG. 2 shows a fractured cross-section of a carbon fiber composite with fibers that have been partially transversely aligned.

In these experiments, magnetically responsive milled carbon fiber (150-micron nominal length, 8-micron nominal diameter) was dispersed in water. The water contains a combination of surfactants (<1 wt % in water). The aqueous dispersion was cast on a thermoplastic film and subjected to vertical magnetic fields (>0.5 T). Within two minutes, the material was removed from the magnetic field, and the water was evaporated. After the material fully dried, the material was impregnated with a hot-melt epoxy. The fully impregnated material was consolidated under 100 psi (690 kPa) pressure and 250° F. (120° C.) temperature. The resultant cured composite material was cross-sectioned and analyzed via scanning electron microscope. The image of this cross-sectional analysis is shown in FIG. 1. FIG. 2 is similar, but illustrates an embodiment without the application of magnetic fields.

Example 2

This example illustrates a comparison of materials prepared in accordance with Example 1, and control experiments. In particular, finite element analysis was performed on three cases: 1) monolithic steel, 2) a sandwich with transverse carbon fiber composite (shown as "ZRT") core and steel skins (i.e., an A/B/A structure), and 3) a pure epoxy polymer core with steel skins (i.e. an A/B/A structure). All configurations had identical thickness. The dimensions of these cases is shown in FIG. 3.

It was found that the material with transverse carbon fiber composite layer has higher transverse stiffness than the material with the epoxy layer, as is shown in FIG. 3. This demonstrates that a core material with higher transverse stiffness resulted in a higher overall relative bending stiffness for the composite. In this example, the increase was nearly 40%. FIG. 4 shows that integrating a transverse carbon fiber core with metal skins is an effective method to reduce the weight and cost of various components.

Example 3

One embodiment described in this non-limiting example comprises a 0.3 mm 7000-series aluminum alloy skin, a 0.78 mm Z-axis carbon fiber/thermoplastic composite core, and a 0.3 mm 7000-series aluminum alloy skin. The aluminum skins "sandwich" the core.

This material can be used in a stamping process where the core material is softened through the application of infrared energy, ohmic heating by passing current through the core, convection heating, etc. After the core is warmed so it is no longer brittle, it can be, for example, stamp-formed and/or die cut into a component. The resulting component can be used in a variety of applications, such as an electric vehicle battery pack tray or cover, a frame or closure panel for a vehicle, cabin interior or seating component, or an enclosure for an electronic device, or other applications such as those described herein.

Example 4

This example illustrates a composite comprising a titanium alloy skin, a Z-axis carbon fiber/thermoplastic composite core, and another titanium alloy skin. The skins "sandwich" the core.

This material can be used in a stamping process where the core material is softened through the application of infrared energy, ohmic heating by passing current through the core, convection heating, etc. After the core is warmed so it is no longer brittle, it can be, for example, stamp-formed and/or die cut into a component. The resulting component can be used in a variety of applications, such as in a golf club, load bearing structure or skin of an aircraft, or an enclosure for an electronic device, or other applications such as those described herein.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
a composite comprising a first substantially metallic layer and a second substantially metallic layer, a core layer positioned between the first substantially metallic layer and the second substantially metallic layer, and a first polymer layer and a second polymer layer sandwiching the core layer,
wherein the core layer comprises a plurality of discontinuous fibers substantially transversely aligned in parallel at a fiber volume fraction of between 5 vol % and 91 vol % within the composite, wherein the discontinuous fibers have an average diameter of at least 10 micrometers and consist essentially of one material, wherein the material is carbon.

2. The article of claim 1, wherein the first substantially metallic layer comprises steel.

3. The article of claim 1, wherein the first substantially metallic layer comprises an alloy of steel.

4. The article of claim 1, wherein the first substantially metallic layer comprises at least 80 wt % steel.

5. The article of claim 1, wherein the discontinuous fibers are aligned substantially orthogonally to the first substantially metallic layer.

6. The article of claim 1, wherein the composite further comprises a third substantially metallic layer, and a second core layer positioned between the second substantially metallic layer and the third substantially metallic layer.

7. The article of claim 6, wherein the second core layer comprises a plurality of discontinuous fibers substantially transversely aligned at a fiber volume fraction of at least 30 vol % within the second core layer.

8. The article of claim 1, wherein the discontinuous fibers have a carbon content greater than 94% and a modulus of at least 200 GPa.

9. The article of claim 1, wherein the discontinuous fibers are coated with a coating.

10. The article of claim 1, wherein the discontinuous fibers are coated with sizing.

11. The article of claim 1, wherein the discontinuous fibers have an anisotropic diamagnetic response in response to a magnetic field.

12. The article of claim 1, wherein the discontinuous fibers exhibit a physical response to a magnetic field strength of 10 T.

13. The article of claim 1, wherein at least 50 vol % and no more than 91 vol % of the plurality of discontinuous fibers are substantially transversely aligned.

14. The article of claim 1, wherein at least some of the plurality of discontinuous fibers have a plurality of magnetic particles adsorbed thereto.

15. The article of claim 1, wherein the plurality of discontinuous fibers are free of magnetic particles.

16. The article of claim 1, wherein the composite is substantially free of paramagnetic or ferromagnetic materials.

17. The article of claim 1, wherein the discontinuous fibers comprise at least 20 vol % and no more than 91 vol % of the volume of the composite.

18. The article of claim 1, wherein the composite further comprises a binder binding the first substantially metallic layer and the second substantially metallic layer, and the plurality of discontinuous fibers.

19. The article of claim 1, wherein the plurality of discontinuous fibers are substantially transversely aligned in parallel such that the plurality of discontinuous fibers exhibit an alignment such that at least 50% of the fibers exhibit an alignment that is within 20° of the average alignment of the plurality of the fibers.

20. An article, comprising:
a composite comprising a first polymer layer and a second polymer layer, and a core layer positioned between the first layer and the second layer, wherein the core layer comprises a plurality of discontinuous fibers substantially transversely aligned in parallel at a fiber volume fraction of between 5 vol % and 91 vol % within the composite, wherein the discontinuous fibers have an average diameter of at least 10 micrometers and consist essentially of one material, wherein the material is carbon.

21. The article of claim 20, wherein the discontinuous fibers are aligned substantially orthogonally to the first polymer layer.

22. The article of claim 20, wherein the composite further comprises a third polymer layer, and a second core layer positioned between the second polymer layer and the third polymer layer.

23. The article of claim 22, wherein the second core layer comprises a plurality of discontinuous fibers substantially transversely aligned at a fiber volume fraction of at least 30 vol% within the second core layer.

24. The article of claim 20, wherein the discontinuous fibers have a carbon content greater than 94% and a modulus of at least 200 GPa.

25. The article of claim 20, wherein the discontinuous fibers are coated with a coating.

26. The article of claim 20, wherein the discontinuous fibers are coated with sizing.

27. The article of claim 20, wherein the discontinuous fibers have an anisotropic diamagnetic response in response to a magnetic field.

28. The article of claim 20, wherein the discontinuous fibers exhibit a physical response to a magnetic field strength of 10 T.

29. The article of claim 20, wherein at least 50 vol% and no more than 91 vol% of the plurality of discontinuous fibers are substantially transversely aligned.

30. The article of claim 20, wherein at least some of the plurality of discontinuous fibers have a plurality of magnetic particles adsorbed thereto.

31. The article of claim 20, wherein the plurality of discontinuous fibers are free of magnetic particles.

32. The article of claim 20, wherein the composite is substantially free of paramagnetic or ferromagnetic materials.

33. The article of claim 20, wherein the discontinuous fibers comprise at least 20 vol% and no more than 91 vol% of the volume of the composite.

34. The article of claim 20, wherein the composite further comprises a binder binding the first polymer layer and the second polymer layer, and the plurality of discontinuous fibers.

35. The article of claim 20, wherein the plurality of discontinuous fibers are substantially transversely aligned in parallel such that the plurality of discontinuous fibers exhibit an alignment such that at least 50% of the fibers exhibit an alignment that is within 20° of the average alignment of the plurality of the fibers.

* * * * *